(12) United States Patent
Kurtz et al.

(10) Patent No.: US 8,497,759 B2
(45) Date of Patent: Jul. 30, 2013

(54) LEADLESS MEDIA PROTECTED FAST RESPONSE RTD SENSOR AND METHOD FOR MAKING THE SAME

(75) Inventors: Anthony D. Kurtz, Saddle River, NJ (US); Nora Kurtz, legal representative, Saddle City, NJ (US); Alexander Ned, Kinnelon, NJ (US); Vikram Patil, Hoboken, NJ (US); Joseph VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 612 days.

(21) Appl. No.: 12/731,427

(22) Filed: Mar. 25, 2010

(65) Prior Publication Data
US 2011/0235678 A1    Sep. 29, 2011

(51) Int. Cl.
*H01C 3/04*    (2006.01)
(52) U.S. Cl.
USPC ............................................. 338/25; 338/28
(58) Field of Classification Search
USPC ..................................................... 338/25, 28
See application file for complete search history.

(56) References Cited

U.S. PATENT DOCUMENTS

| | | | | |
|---|---|---|---|---|
| 4,375,056 A * | 2/1983 | Baxter et al. | ..................... | 338/25 |
| 6,437,681 B1 * | 8/2002 | Wang et al. | ..................... | 338/25 |
| 7,131,766 B2 * | 11/2006 | Sultan et al. | ..................... | 374/29 |
| 7,404,320 B2 * | 7/2008 | Sakuma et al. | ............ | 73/204.26 |
| 7,495,542 B2 * | 2/2009 | Saio et al. | ..................... | 338/306 |
| 2006/0157840 A1 * | 7/2006 | Kurtz et al. | ................... | 257/680 |

\* cited by examiner

*Primary Examiner* — Kyung Lee
(74) *Attorney, Agent, or Firm* — Troutman Sanders LLP; James E. Schutz; Jihan A. R. Jenkins

(57) ABSTRACT

The RTD device of the present invention is comprised of a semiconductor substrate and a substantially thin conductive metal layer disposed upon the semiconductor substrate, wherein the conductive metal has a substantially linear temperature-resistance relationship. The conductive layer is etched into a convoluted RTD pattern, which consequently increases the overall resistance and minimizes the overall mass of the RTD assembly. A contact glass cover and a conductive metal-glass frit are placed over the RTD assembly to hermetically seal the RTD. The resultant structure can be "upside-down" mounted onto a header or a flat shim so that the bottom surface of the semiconductor substrate is exposed to the external environment, thus shielding the RTD from external forces. The resultant structure is a low mass, highly conductive, leadless, and hermetically sealed RTD that accurately measures the temperature of liquids and gases and maintains fast response time in high temperatures and harsh environments.

14 Claims, 8 Drawing Sheets

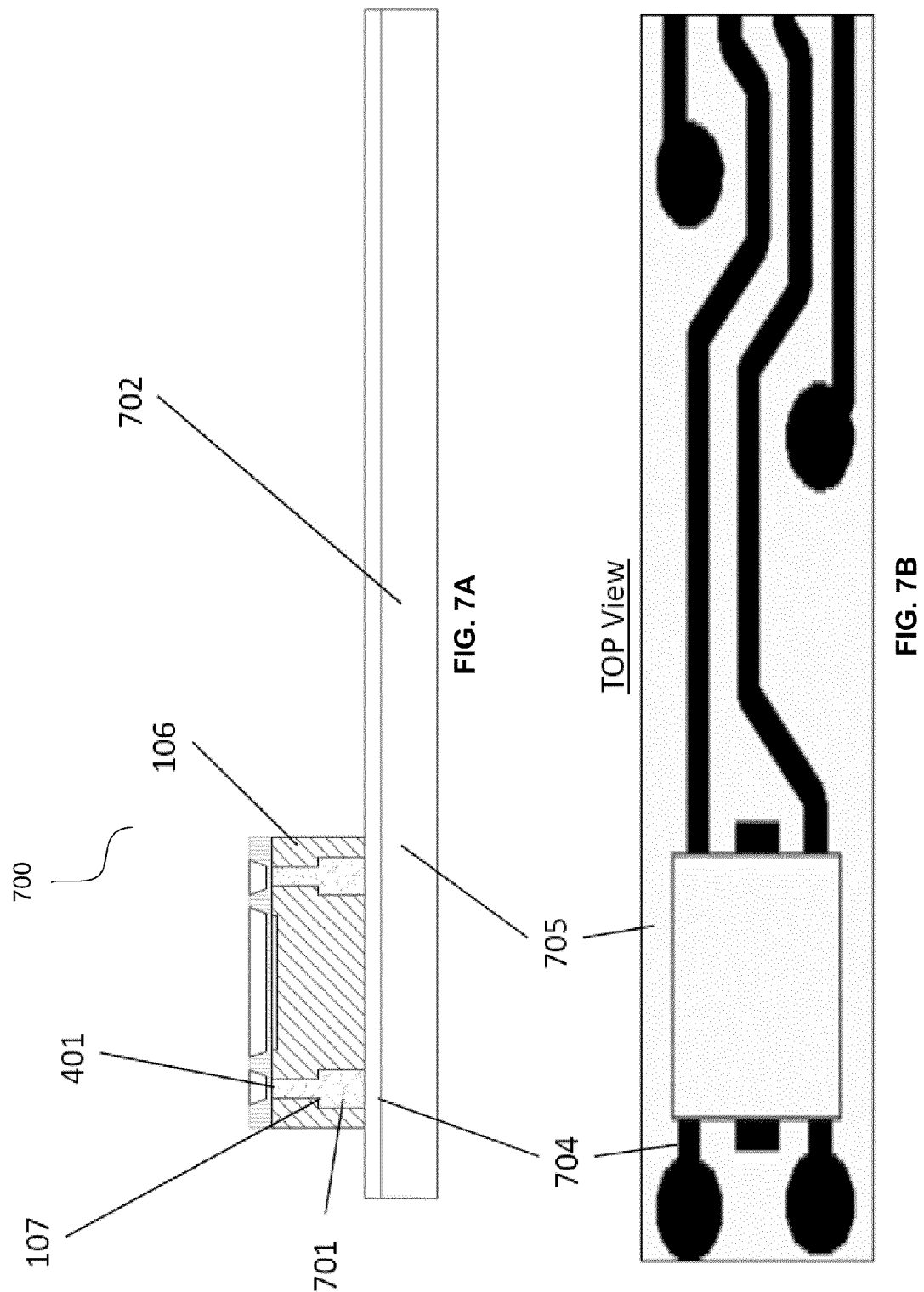

LEADLESS MEDIA PROTECTED FAST RESPONSE RTD SENSOR AND METHOD FOR MAKING THE SAME

TECHNICAL FIELD

The present invention relates to Resistance Temperature Detectors, and more particularly to a fast response resistance temperature detector capable of operating in high temperatures and harsh environments.

BACKGROUND

Resistance Temperature Detectors (RTDs) are able to measure temperature using the natural correlation temperature has with the electrical resistivity of metals. RTDs are great devices to use for measuring the temperature of liquids and gases because of their long-term stability, ease of recalibration, repeatability, and precision over relatively narrow temperature spans.

Traditionally, Resistance Temperature Detectors (RTDs) were wire-wound devices that included a length of wire wrapped around a probe. To protect this wire-wound RTD from the external environment, a metal sheath or cover was placed over the device. Adding the cover, however, reduced the RTD's response time as heat had to first transfer through the cover before reaching the RTD.

Today, RTDs are commonly made by disposing a conductive metal film onto a semiconductor substrate and etching the conductive metal film into a resistance temperature detector pattern. Relatively cheap metals such as copper or nickel are sometimes used as the conductive metal. However, these metals are restricted in their temperature measurement range because of their non-linear temperature-resistance relationships. To avoid this set-back, most RTD designs use platinum as the conductive metal. Platinum is desirable because its chemical inertness and nearly linear temperature-resistance relationship enable an RTD to precisely measure temperature. To remain stable, however, platinum must remain in its pure form and be shielded from high temperatures and harsh environments. A variation of covers have been used in the past to shield platinum from external environments, however these covers share the drawbacks mentioned above of having a slow response time due to heat being transferred slowly through the cover prior to being measured by the RTD. Because of the slow response time of such RTDs, they are not commonly used in applications requiring rapid response. This is especially true in high temperatures and harsh environments, such as those commonly found in automobile engines and jet engines. Accordingly, there is a need for a fast response RTD that operates in high temperatures and harsh environments.

BRIEF SUMMARY OF THE INVENTION

The various embodiments of the present invention provide an RTD having low mass components and a method of making the same such that the resulting RTD has a fast response time in high temperatures and harsh environments. One way to achieve this need involves hermetically sealing the RTD sensing network with a glass cover and exposing the backside of the semiconductor substrate, on which the RTD sensing network is disposed, to the external environment.

The RTD of the present invention comprises a semiconductor substrate and a conductive layer. The conductive layer is disposed on the top surface of the semiconductor substrate. The semiconductor substrate may be made of silicon and its top and bottom surface may be oxidized. The conductive layer has a substantially linear temperature-resistance relationship and is etched into a resistance temperature detector pattern having at least two low resistance contacts. Platinum may be used as the conductive layer and a bonding layer of titanium may be used to enhance the bonding between the oxidized surface of the semiconductor substrate and the platinum layer.

To hermetically seal the RTD, a contact glass cover may be bonded to the semiconductor substrate wherein the contact glass cover has a centrally aligned cavity to overlie the resistance temperature detector pattern. The contact glass cover may also have apertures that are aligned with the low resistance contacts and filled with a conductive metal-glass frit to hermetically seal the apertures.

The contact glass cover may be mounted onto a header wherein the header has a glass-frit mounting surface that hermetically seals the contact glass cover to the header. The header also has at least two header pins that extend beyond the mounting surface into the metal-glass frit to electrically communicate with the low resistance contacts. The contact class cover may also be mounted onto a flat shim wherein the flat shim has metal contacts aligned with the metal-glass frit to electrically communicate with the low resistance contacts.

The resulting hermetically sealed RTD has very little mass and a fast response time in high temperatures and harsh environments.

BRIEF DESCRIPTION OF THE DRAWINGS

FIG. 7A is a cross-sectional view illustration of an exemplary embodiment of the present invention mounted onto a flat shim.

FIG. 7B is a top view illustration of an exemplary embodiment of the present invention mounted onto a flat shim.

DETAILED DESCRIPTION OF PREFERRED EMBODIMENTS

Figure 1A:
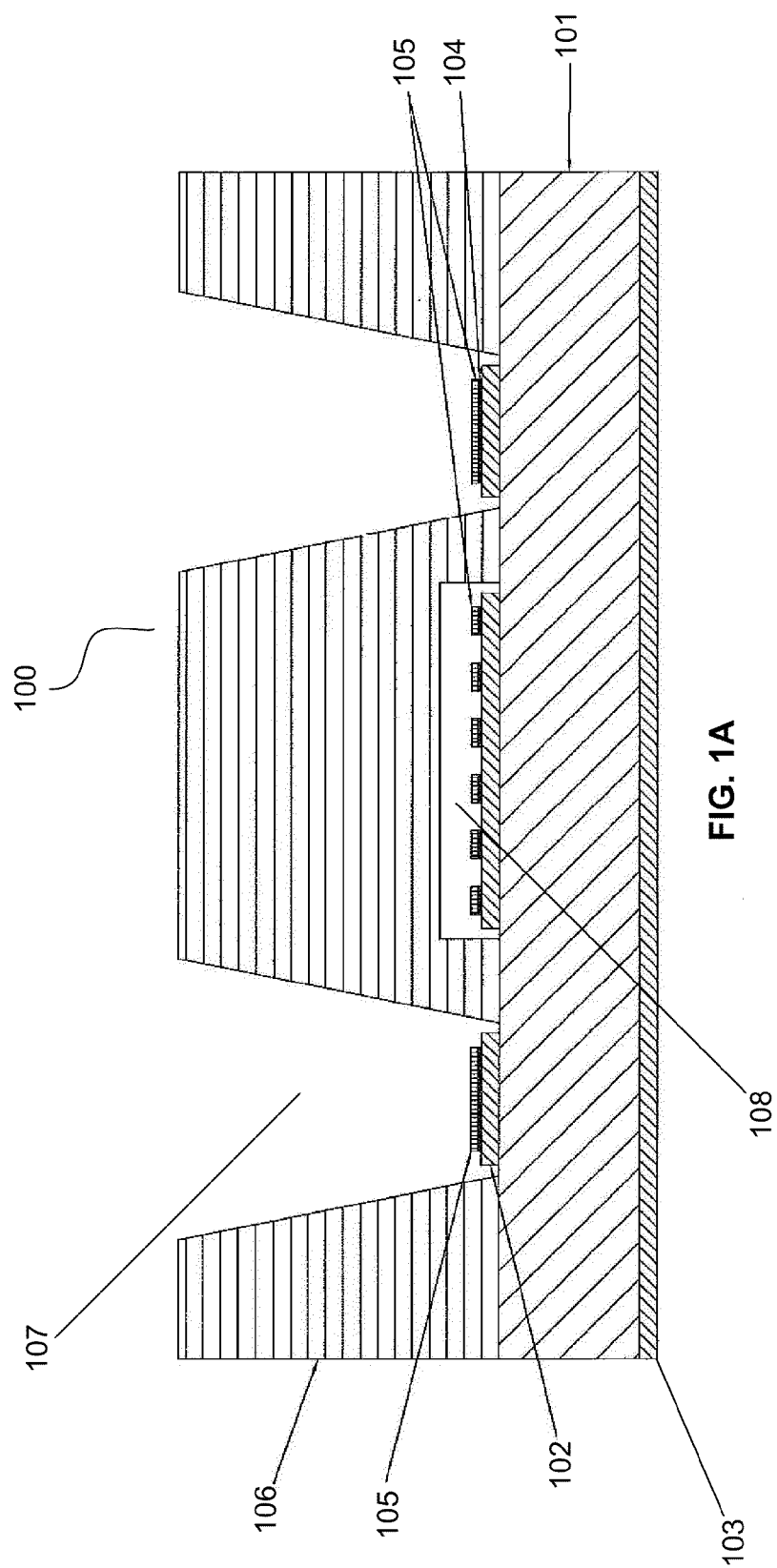
FIG. 1A is a side view illustration of an exemplary embodiment of the present invention showing a semiconductor substrate, an etched RTD pattern with low resistance contacts, and a contact glass cover electrostatically bonded to the semiconductor substrate.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical RTD systems and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

FIG. 1A is a side view illustration of an exemplary embodiment of the present invention showing a semiconductor substrate 101, an etched RTD pattern with low resistance contacts, and a contact glass cover 106 electrostatically bonded to the semiconductor substrate 101. The resulting structure is a fast-responding, low mass RTD sensor wherein an RTD pattern having at least two low resistance contacts is etched into a conductive layer 105 deposited onto a semiconductor substrate 101 wherein a bonding layer 104 may be used to assist in bonding the conductive layer 105 to the semiconductor substrate 101. The RTD sensing network may be hermetically sealed from the external environment using a glass cover 106 and a metal-glass frit to fill the apertures 107 in the glass cover. A bonded glass cover may then be mounted onto a header wherein header pins penetrate the metal-glass frit to electrically communicate with the low resistance contacts.

Figure 1B:
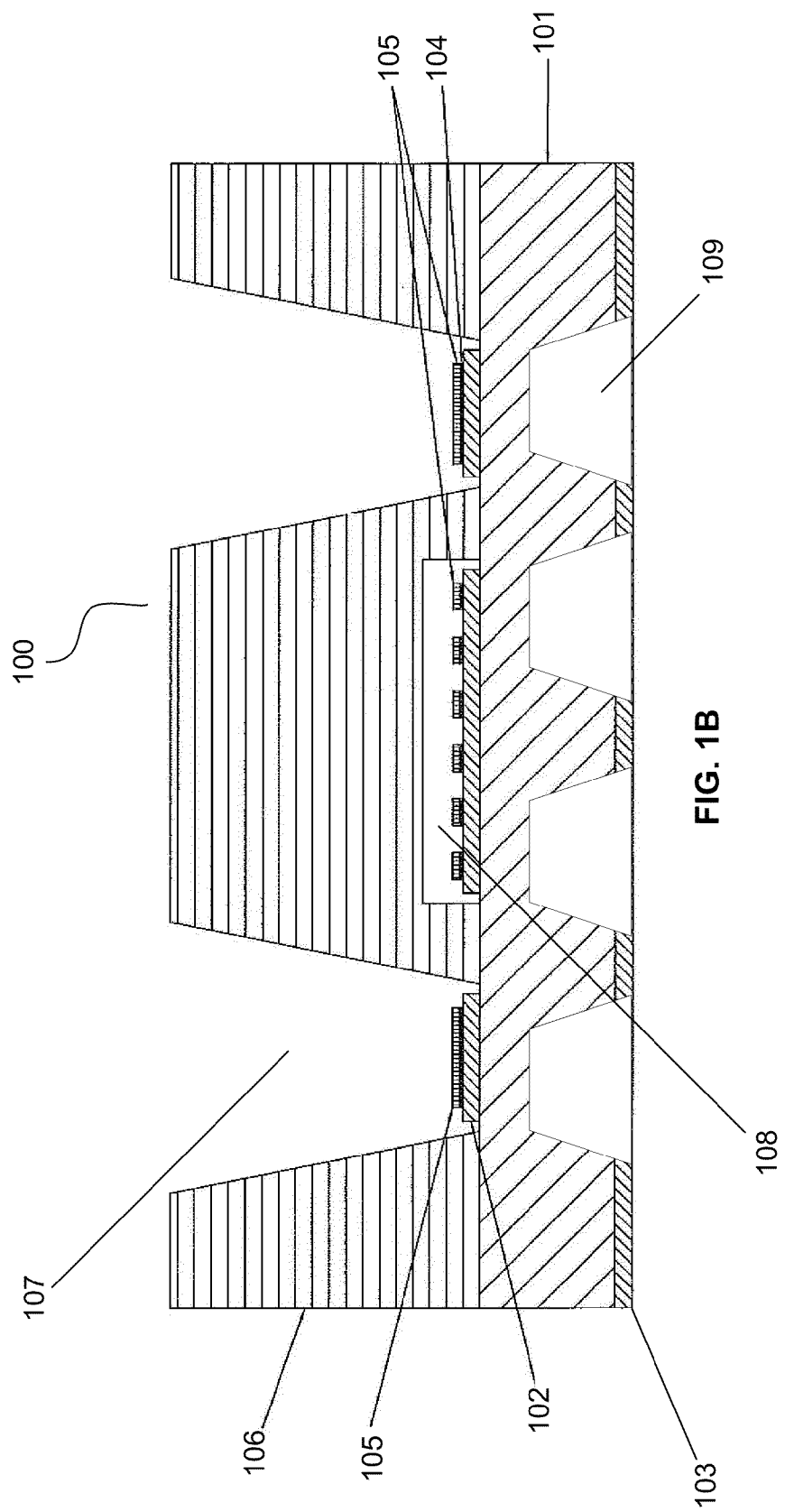
FIG. 1B is a side view illustration of an exemplary embodiment of the present invention showing a semiconductor substrate with backside etched grooves underneath an etched RTD pattern with low resistance contacts and a contact glass cover electrostatically bonded to the semiconductor substrate.

FIG. 1B is a side view illustration of a grooved semiconductor substrate 101 of an exemplary embodiment of the present invention. Grooves 109 may be etched underneath the conductive layer 105 to increase the surface area of the RTD allowing for more heat conduction from the surface to the metal. The grooves 109 may be etched into the semiconductor substrate using standard photolithographic techniques and either dry or wet etching techniques. The grooves 109 also result in a very thin layer of semiconductor substrate 101 between the environment and the conductive 105 layer thus promoting faster heat conduction from environment to the conductive layer 105 of RTD resulting in faster response time. At the same time the thicker portions of the substrate allow for a stiff substrate needed both for electrostatic bonding and for survivability in harsh environments. The grooved silicon substrate 101 also results in further reduction in mass of the RTD.

Figure 2:
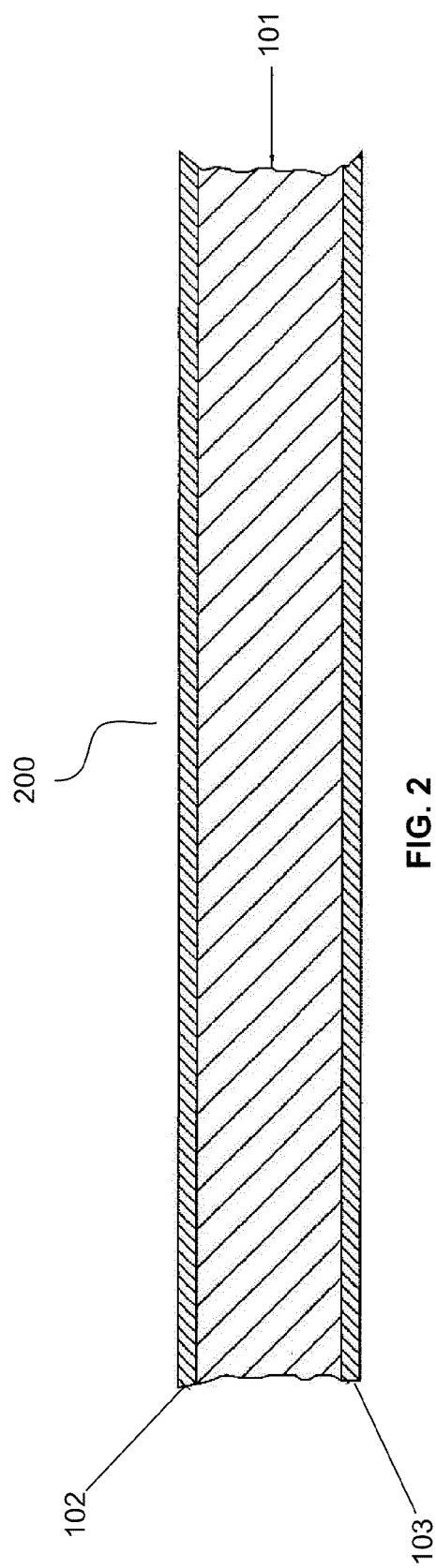
FIG. 2 is a side view illustration of a semiconductor substrate of an exemplary embodiment of the present invention.

FIG. 2 is a side view illustration of a semiconductor substrate 101 of an exemplary embodiment of the present invention. It is particularly important that the semiconductor substrate is able to withstand high temperatures and harsh environments such as those commonly found in automobile engines and jet engines. Therefore, it is desirable that the material used as the semiconductor substrate can withstand temperatures up to 650-700° C. and is adverse to corrosive environments. In a preferred embodiment of the present invention, silicon is used as the semiconductor substrate 101. Silicon is preferred because it has high thermal conductivity, high temperature tolerance, and also because photolithographic techniques can be used on silicon to make an RTD sensor. The preferred dimensions of the silicon semiconductor substrate 101 are 0.050 inches by 0.050 inches with a thickness of 3.0-5.0 mils. However, other dimensions may be used to achieve desired RTD parameters.

The semiconductor substrate 101 has a top surface 102 and a bottom surface 103 wherein at least the top surface 102 is preferably oxidized to enhance bonding properties of the semiconductor substrate 101. Those of skill in the art will appreciate that the bottom surface 103 may also be oxidized. Additionally, in some embodiments it may not be necessary to oxidize either surface of the semiconductor substrate 101 if it is not necessary to improve the bonding characteristics between the silicon substrate and the layer deposited thereon.

Figure 3:
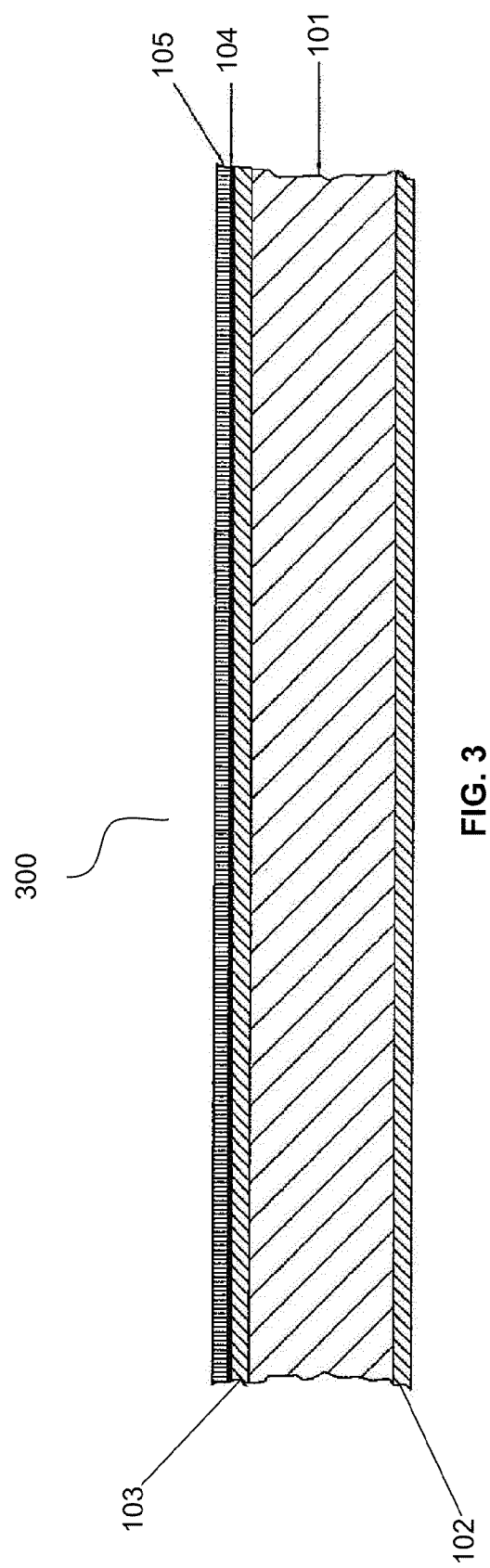
FIG. 3 is a side view illustration of a semiconductor substrate, a bonding layer, and a conductive layer of an exemplary embodiment of the present invention.

FIG. 3 is a side view illustration of a semiconductor substrate 101, a bonding layer 104, and a conductive layer 105 in an exemplary embodiment of the present invention. In a preferred embodiment, the bonding layer 104 is disposed on the top surface 102 of the semiconductor substrate 101 and the conductive layer 105 is disposed on the bonding layer 104. However, in some embodiments it may not be necessary to use a bonding layer 104. Nonetheless, titanium is preferably used as the bonding layer 104 because of its ability to bond to the oxidized top surface 102 of the silicon semiconductor substrate 101. However, those skilled in the art will appreciate that a bonding layer other than titanium may be used. However, while titanium is preferred as a bonding layer 104, platinum is preferably used as the conductive layer 105 because of its chemical inertness and nearly linear temperature-resistance relationship. Again, one skilled in the art will appreciate that other conductive metals can be used.

The thickness of the titanium bonding layer 104 is preferably thin as compared to the conductive layer 105 in order to minimize its affect on the resistivity of the RTD device. For example, it may be on the order of 30 Å. The thickness of the platinum conductive layer 202 is generally substantially thicker than the bonding layer 104 so that the resistivity characteristics of the RTD are close to those of the conductive layer 105. In an exemplary embodiment, the thickness of the platinum conductive layer 202 may be on the order of 3000 Å. The thickness of the platinum conductive layer 202 may vary depending on deposition parameters and desired resistances. Those skilled in the art will appreciate the thicker the platinum conductive layer 202, the longer and thinner the corresponding traces need to be to achieve a given resistance. In an exemplary embodiment of the present invention, it is preferable that the combined thickness of the bonding layer 104 and the conductive layer 105 are still relatively thin to promote a fast temperature response. The titanium bonding layer 104 and platinum conductive layer 105 create a "metal film" on the semiconductor substrate 101. Those of skill in the art will recognize the dimensions of the metal layers will be the primary factor in the temperature response of the device. Thus, it is desirable to minimize the thickness of the titanium bonding layer 104 as titanium does not have resistivity characteristics that are as desirable as those of platinum.

Figure 4:
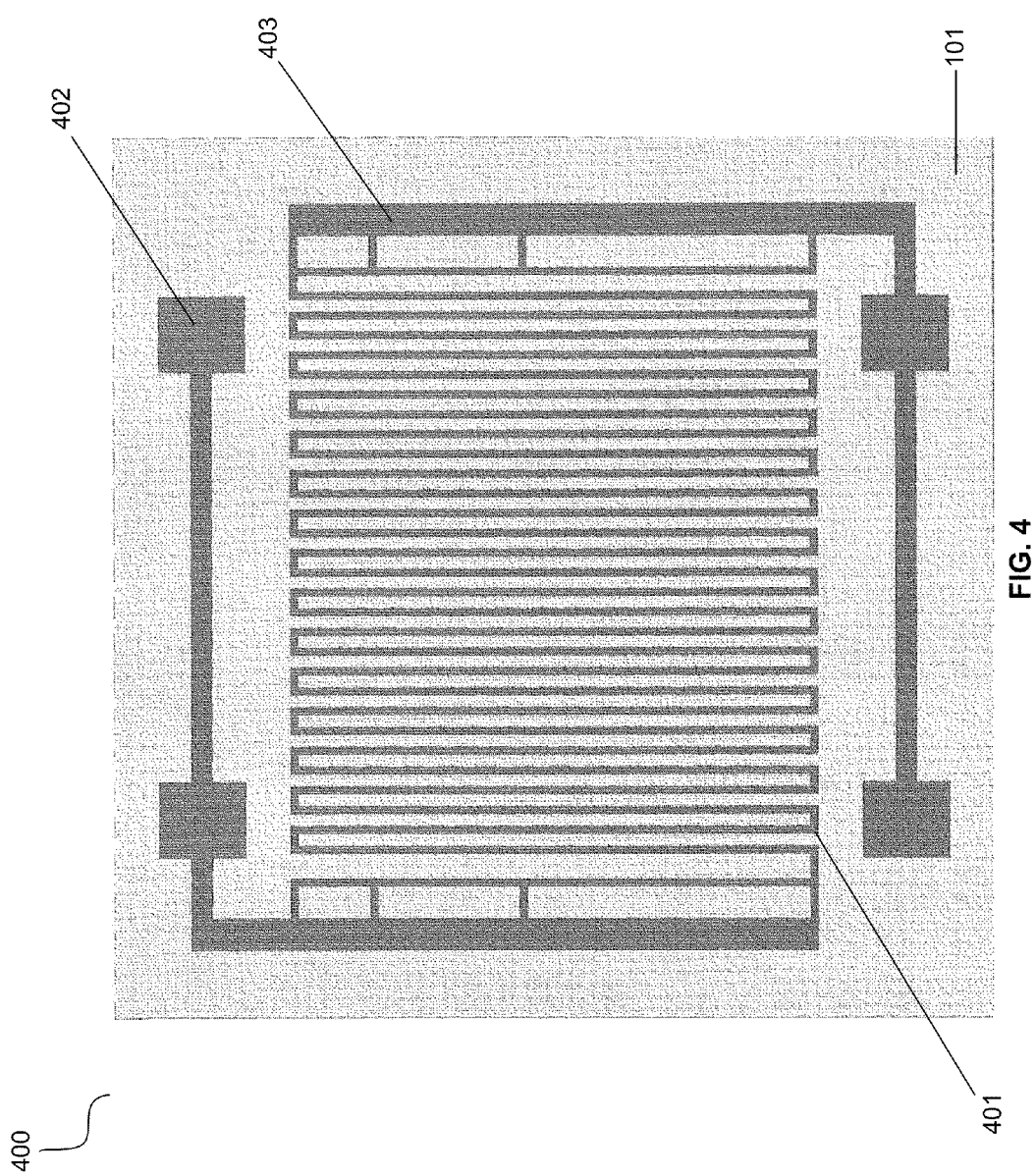
FIG. 4 is a top view illustration of an etched RTD pattern, low resistance contacts, and trim links of an exemplary embodiment of the present invention.

FIG. 4 is a top view illustration of an etched RTD pattern 401, low resistance contacts 402, and trim links 403 in an exemplary embodiment of the present invention. By using photolithographic techniques, a convoluted pattern may be formed by etching away parts of the metal film to create a preferred titanium-platinum RTD pattern 401. Titanium has a resistivity of 42 μΩ-cm and a temperature coefficient of resistance (TCR) of 0.21%/° C. while platinum has a resistivity of 10.6 μΩ-cm and a TCR of 0.3897%/° C. To calculate the composite titanium-platinum resistivity and TCR, one skilled in the art will appreciate that the thickness ratio of the titanium bonding layer 104 to the platinum conductive layer 105 is a primary factor. As stated above, in a preferred embodiment of the present invention, the thickness ratio of the titanium bonding layer 104 to the platinum bonding layer is 30 Å to 3000 Å, respectively. Further, as stated above, titanium does not have resistivity characteristics as desirable as platinum for RTD use so the titanium bonding layer 104 is preferably substantially thinner than the platinum conductive layer 105. Taking the titanium thickness to platinum thickness ratio into account, a preferred embodiment of the present invention has a composite titanium-platinum resistivity of 10.68 μΩ-cm and a TCR of 0.3892%/° C., thus giving an error of less than 0.3° C. over 100° C. and less than 1.0° C. over 400° C.

One skilled in the art will also appreciate that the electrical resistance of the RTD pattern 401 is directly proportional to its length. Elongating the length of the RTD pattern 401 is desirable as extra resistance allows for tighter control of the total resistance and thus the overall temperature measurement. However, while elongating the length of the RTD pattern is desirable, coupled with it is the risk that the mass of the total RTD assembly will increase as a linear RTD pattern would have to be mounted onto a larger semiconductor substrate 101. Therefore, in a preferred embodiment of the present invention, the RTD pattern 401 is convoluted as illustrated in FIG. 4, such that an elongated length of the pattern is achieved without unduly increasing the overall mass of the RTD assembly. One skilled in the art will appreciate that the convoluted RTD pattern shown in FIG. 4 is just one way to achieve this result, as many other patterns may be used, such as a spiral or wave-like pattern. Irrespective of the design of the RTD pattern 401, one skilled in the art will appreciate that at least two resistance contacts 402, one to serve as an input and one to serve as an output, are part of the pattern.

In addition to the titanium-platinum RTD pattern 401 and low resistance contacts 402, a series of trim resistors 403 may also be formed on the RTD. These extra trim resistors 403 allow for tight control over the total resistance of the RTD by allowing extra resistance to be added to it. When first formed, the trim resistors 403 are shorted by much wider traces effectively eliminating them from the circuit. These wide traces can be cut with a laser thereby adding extra resistance into the circuit in a binary fashion (i.e., 1, 2, 4, 8, 16, or 32 ohms). In this way the resistance of the RTD can be controlled within 1 ohm. Two additional contact areas may also be created to allow for a full 4-wire RTD. As is well known in the art, performing a 4-wire measurement allows for measurement of the resistance of the device while eliminating any contact resistance.

Figure 5:
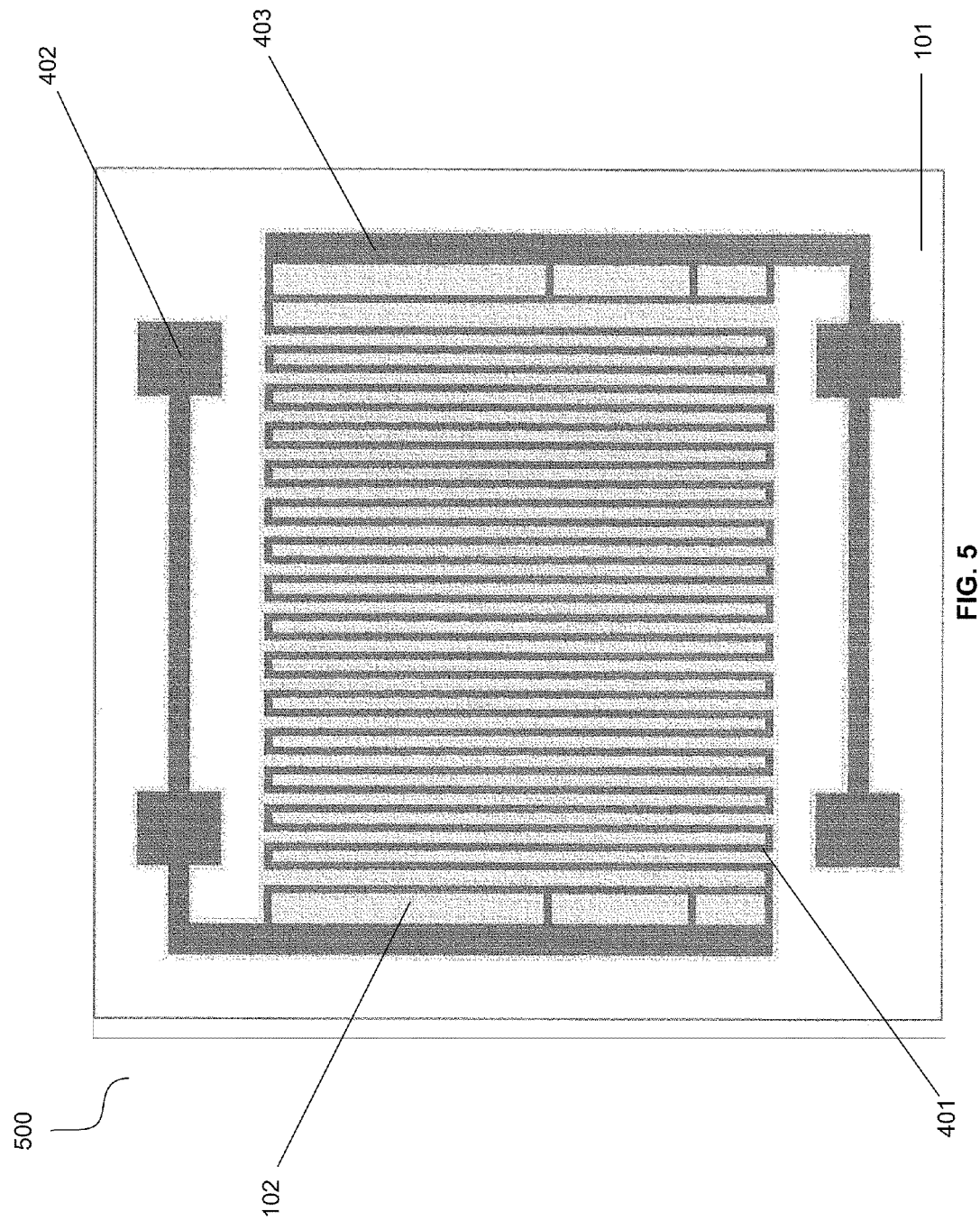
FIG. 5 is a top view illustration of an etched RTD pattern, low resistance contacts, trim links, and exposed non-oxidized semiconductor substrate of an exemplary embodiment of the present invention.

FIG. 5 is a top view illustration of an etched RTD pattern 401, low resistance contacts 402, trim links 403, and exposed non-oxidized semiconductor substrate 101 of an exemplary embodiment of the present invention. In a preferred embodiment of the present invention, the outside perimeter of the oxidized top surface 102 is etched away leaving a smooth non-oxidized outer surface of the silicon semiconductor substrate 101. This creates a "raised rim" effect as the non-oxidized outer surface 101 is on a lower plane than the oxidized surface 102. This raised rim effect facilitates tighter sealing of the contact glass cover 106 as will be further discussed.

Using the techniques outlined in U.S. Pat. No. 5,955,771 issued Sep. 21, 1999 entitled: SENSORS FOR USE IN HIGH VIBRATIONAL APPLICATIONS AND METHODS FOR FABRICATING SAME by A. D. Kurtz and A. A. Ned and assigned to Kulite Semiconductor Products, Inc., the assignee herein, a contact glass cover 106 is bonded to the non-oxidized portion of the semiconductor substrate 101, as stated above. The raised rim effect enables the contact glass cover 106 to securely bond without a glass frit filler. However, some embodiments may use a glass frit filler to seal the glass cover 106 to the semiconductor substrate 101. The contact glass cover 106 is preferably made of PYREX® glass. Although the preferred shape of the contact glass cover 106 shown in the figures is square, one having ordinary skill in the art will appreciate that geometries other than square may be utilized as the contact glass cover 106 to directly correspond with the shape of the semiconductor substrate 101. The contact glass cover 106 also has apertures 107 aligned with the low resistance contacts 402. Each aperture 107 is accordingly fabricated such that a corresponding header pin 604 can be received therein. The contact glass cover 106 is electrostatically bonded to the semiconductor substrate 101 by placing the structure in a heated vacuum chamber for about 45 minutes at approximately 400° C. Once this electrostatic bonding operation is complete, the RTD is hermetically sealed.

Figure 6:
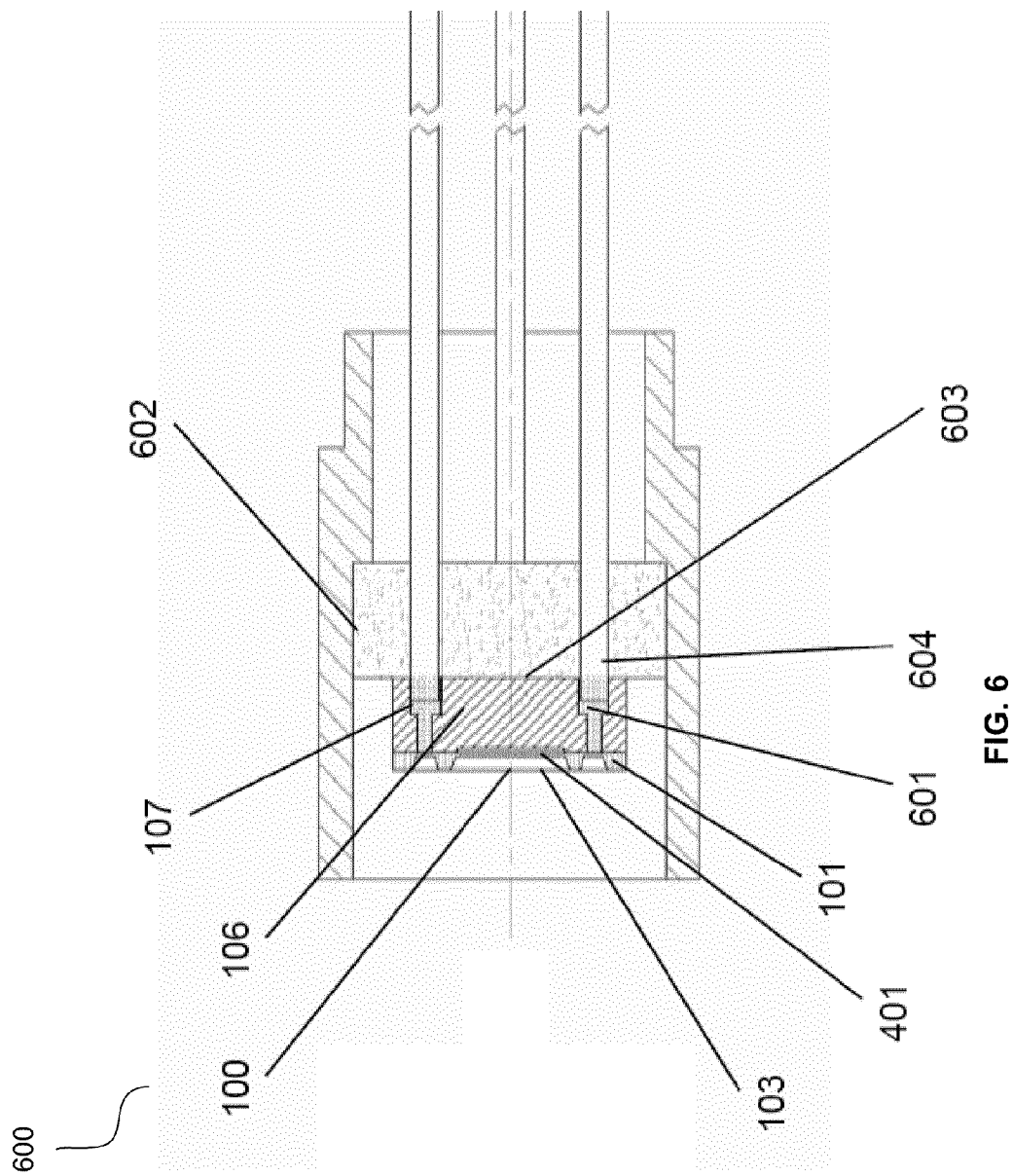
FIG. 6 is a cross-sectional view illustration of an exemplary embodiment of the present invention mounted onto a header.

FIG. 6 is a cross-sectional view illustration of an exemplary embodiment of the present invention 100 mounted to a header 602. To prepare the RTD for header mounting, the apertures 107 in the contact glass cover 106 are preferably filled with a conductive metal-glass frit 601 to enable electrical communication between the RTD pattern 401 and the corresponding header pins 604. The conductive metal-glass frit 601 is preferably a mixture of gold and glass made with PYROCERAM®, a glass material manufactured by Corning Glass Co. PYROCERAM® glass thermosets and devitrifies at temperatures on the order of 450° C. Upon devitrification, the glass develops a crystalline structure which results in a strong seal. PYROCERAM® also has excellent mechanical properties at temperatures well in excess of 400° C. The PYROCERAM® metal-glass frit is prepared by mixing finely powdered PYROCERAM® glass and gold with a suitable suspension vehicle to a desired consistency to form a paste-like mixture. The paste-like mixture of metal-glass frit is injected into each aperture 107 of the contact glass cover 106.

The header 602 is preferably prepared by depositing a layer of PYROCERAM® glass frit 603 (without the gold powder) onto the mounting surface 603 of the header 602. In a preferred embodiment of the present invention, the layer of non-conductive glass frit 603 is deposited onto the header 602 to achieve a thickness of approximately 0.1 to 0.5 mils and the header 602 has a diameter of less than 0.070 inches. The hermetically sealed RTD may then be mounted onto the mounting surface 603 of the header 602 with the contact glass cover 106 facing the mounting surface 603 such that the header pins 604 can penetrate the conductive metal-glass frit 601 filled apertures 107 in the contact glass cover 106. This upside down mounting provides a unique advantage as it protects the RTD from harsh external environments. The structure may be placed into a heated chamber and a uniform, moderate pressure may be applied to ensure the glass frit located between the mounting surface 603 of the header 602 and the contact glass cover 106 is evenly distributed. The resulting structure 600 is preferably heated for about 45 minutes at approximately 500° C. to simultaneously cure the glass frit on the mounting surface 603 and conductive metal-glass frit 601 in the apertures 107. This curing process hermetically seals the header 602 to the contact glass cover 106.

FIG. 7A is a cross-sectional view illustration of an exemplary embodiment of the present invention 100 mounted on a flat shim 702 and FIG. 7B is a top view illustration of the same. Preparing the RTD for the shim mounting is similar to preparing the RTD for header mounting, which is described above. The apertures 107 in the contact glass cover 106 are preferably filled with a conductive metal-glass frit 701 to enable electrical communication between the RTD pattern 401 and the corresponding metal contacts 704 on the flat shim 702. The flexible circuit shim 702 is preferably prepared by depositing a conductive metal layer onto a flexible substrate 705, wherein the flexible substrate 705 may be a high temperature material such as kapton. The conductive metal may then be electroplated and etched into metal contacts 704 onto the surface of the flexible substrate 705. The hermetically sealed RTD is mounted onto the shim 702 with the contact glass cover 106 facing the shim 702, such that the metal contacts 704 are aligned with and electrically communicate with the metal-glass frit 701. This embodiment allows for the removal of the mass associated with the metal header and better flow of high temperature gases around the RTD sensor. This in turn leads to faster response times.

Those skilled in the art will appreciate that the upside down mounting of the RTD is advantageous because exposing the bottom surface 103 of the silicon semiconductor substrate 101 to the external environment consequently shields the RTD assembly from external forces. Because the RTD assembly is effectively shielded from the external environment, high temperatures and harsh external environments will not interfere with the overall operability of the RTD assembly. Those skilled in the art will also appreciate that the high thermal conductivity of the silicon semiconductor substrate 101 enables heat from the external environment to transfer to the conductive layer of the RTD 105 therefore enabling the RTD to accurately measure temperature.

Additionally, by exposing the bottom surface of the silicon semiconductor substrate 101 to the external environment there is no need for a protective cover commonly found in the prior art. This protective cover is not to be confused with the contact glass cover of the present invention. In the prior art, RTD protective covers surround an entire RTD assembly (including the semiconductor substrate) such that the external portion of the protective cover is exposed to the external environment. Conversely, in the present invention, the bottom surface of the semiconductor substrate is exposed to the external environment and the contact glass cover serves as a hermetical seal for the RTD.

The resulting device 600, 700 is a low mass, highly conductive, leadless, and hermetically sealed RTD that accurately measures the temperature of liquids and gases and maintains fast response time in high temperatures and harsh environments.

We claim:

1. A resistance temperature detector sensor comprising:
   a semiconductor substrate having a top surface and a bottom surface wherein the bottom surface is exposed to an external environment to be measured; and
   a conductive layer having a substantially linear temperature to resistance relationship, wherein said conductive layer is disposed on the top surface of the semiconductor substrate and etched into a resistance temperature detector pattern having at least two low resistance electric contacts;
   wherein the top surface of the semiconductor substrate and the conductive layer are covered with a contact glass to hermetically seal the conductive layer wherein the contact glass has apertures aligned with the low resistance contacts.

2. The resistance temperature detector sensor of claim 1, further comprising a plurality of grooves etched into the semiconductor substrate aligned with the resistance temperature detector pattern.

3. The resistance temperature detector sensor of claim 1, wherein a protective cover is not present.

4. The resistance temperature detector sensor of claim 1, wherein a metallic protective cover is not present.

5. The resistance temperature detector sensor of claim 1, wherein heat from an external environment is transferred through the semiconductor substrate to the resistance temperature detector pattern to be measured.

6. The resistance temperature detector sensor of claim 1, wherein the conductive layer is hermetically sealed.

7. The resistance temperature detector sensor of claim 1, wherein at least the top surface is oxidized.

8. The resistance temperature detector sensor of claim 1, wherein the semiconductor substrate is silicon.

9. The resistance temperature detector sensor of claim 1, wherein the conductive layer is platinum.

10. The resistance temperature detector sensor of claim 1, wherein a bonding layer assists in bonding the conductive layer to the semiconductor substrate.

11. The resistance temperature detector sensor of claim 1, wherein a series of trim resistors control the total resistance of the resistance temperature detector pattern.

12. The resistance temperature detector sensor of claim 1, wherein a conductive metal-glass frit is disposed into the apertures of the contact glass.

13. The resistance temperature detector sensor of claim 12, wherein the contact glass is mounted to a header having a glass-frit mounting surface and at least two header pins that extend beyond the mounting surface into the metal-glass frit to electrically communicate with the low resistance contacts.

14. The resistance temperature detector sensor of claim 12, wherein the contact glass is mounted to a flat shim having at least two metal contacts correspondingly aligned with the metal-glass frit and adapted to electrically communicate with the low resistance contacts.

* * * * *